(12) United States Patent
Rosychuk et al.

(10) Patent No.: US 7,937,506 B2
(45) Date of Patent: May 3, 2011

(54) RESTORING DATA TO A POINT IN A CONTINUUM OF INPUT/OUTPUT OPERATIONS

(75) Inventors: Shaun Rosychuk, Sherwood Park (CA); Harald Burose, Gaufelden (DE)

(73) Assignee: Hewlett-Packard Development Company, L. P., Houston, TX (US)

( * ) Notice: Subject to any disclaimer, the term of this patent is extended or adjusted under 35 U.S.C. 154(b) by 161 days.

(21) Appl. No.: 12/262,670

(22) Filed: Oct. 31, 2008

(65) Prior Publication Data
US 2010/0115161 A1    May 6, 2010

(51) Int. Cl.
*G06F 3/00* (2006.01)
*G06F 13/00* (2006.01)
(52) U.S. Cl. .................. 710/18; 710/8; 710/15; 710/19
(58) Field of Classification Search .................. None
See application file for complete search history.

(56) References Cited

U.S. PATENT DOCUMENTS
2005/0063374 A1 * 3/2005 Rowan et al. ................. 370/382

OTHER PUBLICATIONS

Stanek, William R., Windows Vista: the Definitive Guide, O'reilly Media, Inc., Feb. 2007 [accessed online on Nov. 9, 2010], Section titled "Creating Backups and Preparing for Problems" [Online, URL: books.google.com].*
Hewlett-Packard Development Company, L.P., "HP StorageWorks Continuous Information Capture," product brief, 2 pages (Apr. 2006).
Wikipedia, definition of "Continuous data protection," 2 pages (at least as early as Sep. 25, 2008).

* cited by examiner

*Primary Examiner* — Tariq R. Hafiz
*Assistant Examiner* — Scott Sun

(57) ABSTRACT

To restore data, substantially continuous recording of input/output (I/O) operations in a storage system is performed to provide an I/O continuum of I/O operations. Based on analyzing activity associated with the storage system, points in the I/O continuum associated with valid data are identified. Data in the storage system is restored to one of the identified points.

18 Claims, 2 Drawing Sheets

RESTORING DATA TO A POINT IN A CONTINUUM OF INPUT/OUTPUT OPERATIONS

BACKGROUND

Data protection is often performed to protect data stored in a storage system. A traditional form of data protection is data backup, in which a current version of data is copied to a backup storage location at periodic intervals (e.g., once a day, once a week, etc.). In case of failure or data error, data can be recovered back to a prior version of the data, such as to the most recent backup copy of data.

A traditional data backup scheme only allows data to be restored to versions of data backed up at points in time that are relatively far apart (e.g., 24 hours apart, one week apart, etc.). With such a traditional data backup scheme, it is not possible to restore data to a time point between data backups.

To address this issue, continuous data protection schemes have been proposed, in which every input/output (I/O) operation that modifies data, such as every write operation, is recorded to a backup storage location. Continuous data protection is also sometimes referred to as continuous backup or real-time backup. Recording each I/O operation that modifies data allows data to be restored to any point in a continuum of the recorded I/O operations, which enhances flexibility for data recovery operations. However, being able to revert to any specific point in a continuum of the recorded I/O operations may not be useful if data is being recovered to a point in the continuum associated with invalid data. Invalid data refers to data of relatively low quality or that is likely to be inconsistent. For example, recovering data to a time point in a period of high use (involving very high rates of data writes to a storage system) may likely lead to recovering data that is incomplete or of questionable quality.

BRIEF DESCRIPTION OF THE DRAWINGS

Some embodiments of the invention are described with respect to the following figures.

DETAILED DESCRIPTION

In accordance with some embodiments, a storage system implements a substantially continuous data protection mechanism in which input/output (I/O) operations that modify data in the storage system are substantially continuously recorded. An I/O operation that modifies data can include a write operation, an update operation, or a delete operation. "Substantially continuous" recording of I/O operations that modify data refers to any one or more of the following: (1) recording each and every I/O operation that modifies data in the storage system, or (2) recording I/O operations at relatively short time intervals (e.g., once every second, once every minute, once every hour, etc.) that are shorter than time intervals used in traditional backup schemes. Thus, a system is considered to substantially continuously record I/O operations if the I/O operations are recorded at time intervals of one hour or less, or alternatively, at time intervals of one minute or less.

The substantially continuous recording of I/O operations causes a continuum of I/O operations (referred to as an "I/O continuum") to be stored in a backup storage location. In accordance with some embodiments, an analysis module is provided to analyze certain characteristics associated with the storage system (discussed in further detail below) to identify points in the I/O continuum associated with valid data. Data is considered to be valid if the data is expected to be of relatively high quality or to be consistent.

When a request is received to restore data, such as due to a detected data error or for any other reason, the data can be restored to one of the identified points of the I/O continuum associated with valid data. In some implementations, the data is restored to the most recent valid point in the I/O continuum. In other implementations, the data can be restored to some other one of the identified points in the I/O continuum based on some other criterion (or criteria).

Figure 1:
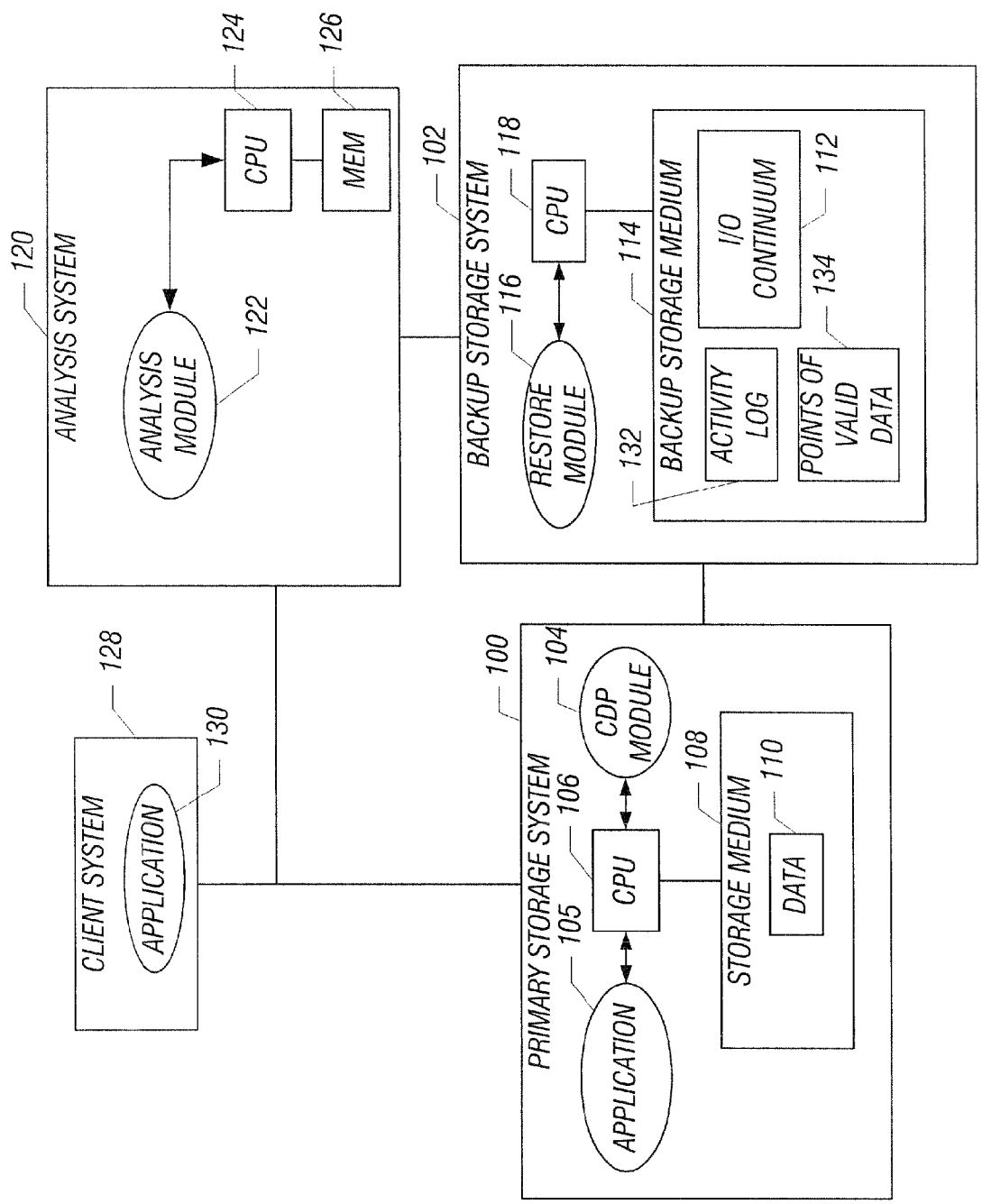
FIG. 1 is a block diagram of an exemplary system that incorporates an embodiment of the invention.

FIG. 1 illustrates an exemplary processing system that includes a primary storage system 100 and a backup storage system 102 for storing backup data for the primary storage system 100. The primary storage system 100 can be a central repository of data such as a storage array system or a storage area network of storage devices. Alternatively, the primary storage system 100 can be a server system that has one or more processes accessible by users in a network, where as part of the execution of the processes data is stored in the server system. The term "storage system" thus refers to any system that is able to store data.

In FIG. 1, the primary storage system has a continuous data protection (CDP) module 104 to perform substantially continuous recording of I/O operations that modify data 110 stored in a storage medium 108 of the primary storage system 100. The CDP module 104 can be a software module executable on one or more central processing units (CPUs) 106 in the primary storage system 100. The CPU(s) 106 is (are) connected to the storage medium 108, which can be implemented with any of various types of storage devices, such as disk-based storage devices, semiconductor storage devices, and so forth.

The CDP module 104 can perform substantially continuous data protection of all of the data 110 stored in the primary storage system 100, or alternatively, of some portion (less than all) of the data 110. For example, if the primary storage system 100 is a server that has multiple processes, the CDP module 104 can perform substantially continuous data protection for some subset (less than all) of the processes in the server. As another example, if the primary storage system 100 is part of a database system that stores various tables, the CDP module 104 can perform substantially continuous data protection for some of the tables.

The substantially continuous recording of I/O operations that modify data in the primary storage system 100 causes a continuum of I/O operations to be created. This continuum of I/O operations (also referred to as an "I/O continuum") can be stored in the backup storage system 102. For example, as depicted in FIG. 1, a backup storage medium 114 in the backup storage system 102 stores an I/O continuum 112 created by the CDP module 104 in the primary storage system 100. Although the I/O continuum 112 is depicted as being stored in the backup storage system 102, in an alternative implementation, the I/O continuum 112 can be stored in a different partition of the storage medium 108 of the primary storage system 100.

The backup storage system 102 also includes a restore module 116, which can be a software module executable on one or more CPUs 118 in the backup storage system 102. The restore module 116 is able to restore data back to a prior version by recovering data back to some point in the I/O continuum 112.

As further depicted in FIG. 1, one or more client systems 128 are provided that are able to access the data 110 in the primary storage system 100. Each client system 128 includes a software application 130 that is able to issue requests (e.g., read or write requests) to access the data 110 in the primary storage system 100. The primary storage system 100 also includes a software application 105 that is executable on the CPU(S) 106 of the primary storage system 100. For example, the software application 105 can be a database application that is able to access the data 110.

FIG. 1 also shows an analysis system 120 that includes an analysis module 122 executable on one or more CPUs 124 in the analysis system 120. The CPU(s) 124 is (are) connected to a memory 126. In an alternative implementation, the analysis system 120 can be omitted, with the analysis module 122 executable in the primary storage system 100 or backup storage system 102.

The analysis module 122 is able to monitor various types of activities associated with the overall system that includes the primary storage system 100, backup storage system 102, and one or more client systems 128. The activities monitored by the analysis module 122 are those activities that affect data stored in the primary storage system 100. The analysis module 122 can monitor, for example, I/O operations to the storage medium 108 in the primary storage system 100. For example, I/O operations to the storage medium 108 can be block-level operations that access blocks stored on the storage medium 108. Alternatively, or in addition, the analysis module 122 can also monitor I/O requests submitted by the application 105 in the primary storage system 105, or submitted by the application 130 in a client system 128.

The analysis module 122 can also monitor for other activities, such as a storage device in the primary storage system 100 going offline (powered off or otherwise deactivated), flushing or dismounting of a file system, adding or removing database tables, opening new log files or overwriting existing logs, adding or deleting files, and so forth. The analysis module 122 can also monitor for time-based activities, such as detecting that a point in time is in a time period of high storage system use (such as during business hours), or a time period of low storage system use (such as after working hours). Other activities that can be monitored by the analysis module 122 include maintenance or repair of the primary storage system 100.

The various activities monitored by the analysis module 122 are recorded in an activity log 132, which can be stored in the backup storage medium 114 of the backup storage system 102. Alternatively, the activity log 132 can be stored in the storage medium 108 of the primary storage system 100. As yet another alternative, the activity log 132 can also be stored in the memory 126 of the analysis system 120.

The analysis module 122 accesses the activity log 132 to analyze characteristics associated with the activities represented by the activity log 132. The characteristics can include one or more of the following: I/O rates of block-level I/O operations to the storage medium 108 in the primary storage system 100; I/O rates of applications, either application 130 in the client system 128 or application 105 in the primary storage system 100; and specific events that indicate that data may be stable (or not).

The rate at which data (e.g., blocks of data) is being written to the storage medium 108 in the primary storage system 100 can provide an indication of whether data at particular points in time would be valid or invalid. Recovering to a point in time during which there is a high rate (e.g., greater than some predefined threshold) of data modifications would likely lead to recovering invalid data (such as data being incomplete or inconsistent). On the other hand, recovering to a point in time during which the rate of data modifications is low would likely lead to recovering valid data.

It is noted that whether or not a particular point in the I/O continuum 112 is associated with valid data or invalid data can be based on some confidence indicator associated with the particular point. For example, certain points in the I/O continuum 112 can be associated with higher confidence levels, while other points in the I/O continuum can be associated with lower confidence levels. An administrator can define a confidence level greater than some confidence threshold as being indicative of valid data, whereas a confidence level lower than the threshold would be indicative of invalid data.

Application I/O rates also provide an indication of whether a particular point in the I/O continuum 112 is associated with valid or invalid data. Similar to I/O rates to the storage medium 108, high application I/O rates would indicate a greater likelihood of invalid data, while lower application I/O rates would indicate a higher likelihood of valid data.

Events associated with an application can also indicate the likelihood of valid or invalid data. For example, flushing of certain data, such as tables and the like, can indicate that that a portion of data would be likely to be consistent, since that portion of data has been flushed from temporary to storage to persistent storage. Other types of application events or application post-processing events can include the addition or removal of tables in a database, the opening or overwriting of log files, or the addition or deletion of files. Such activity may provide some indication of whether or not the data would be more likely to be valid or invalid.

Another characteristic that can be analyzed by the analysis module 122 is a time-based characteristic. Within and enterprise (e.g., company, educational organization, government agency, etc.), there may be periods of time during which low activity is present. For example, high activity would be present during business hours, while low activity would be present during non-business hours. Points of the I/O continuum 112 corresponding to the low periods of activity would be more likely to be associated with valid data.

Another characteristic that can provide indications of valid data or invalid data are external events such as holidays, storage system maintenance, storage system repair, and so forth.

The various characteristics described above are considered to be characteristics associated with the primary storage system 100, since such characteristics affect validity of data contained in the primary storage system 100. Different ones of the characteristics listed above can be assigned different weights to assign difference importance levels to such characteristics. A higher weight can indicate that a particular characteristic is more important in indicating whether or not data is valid or invalid, while a lower weight can indicate that a particular characteristic is less important in indicating whether or not data is valid or invalid.

Figure 2:
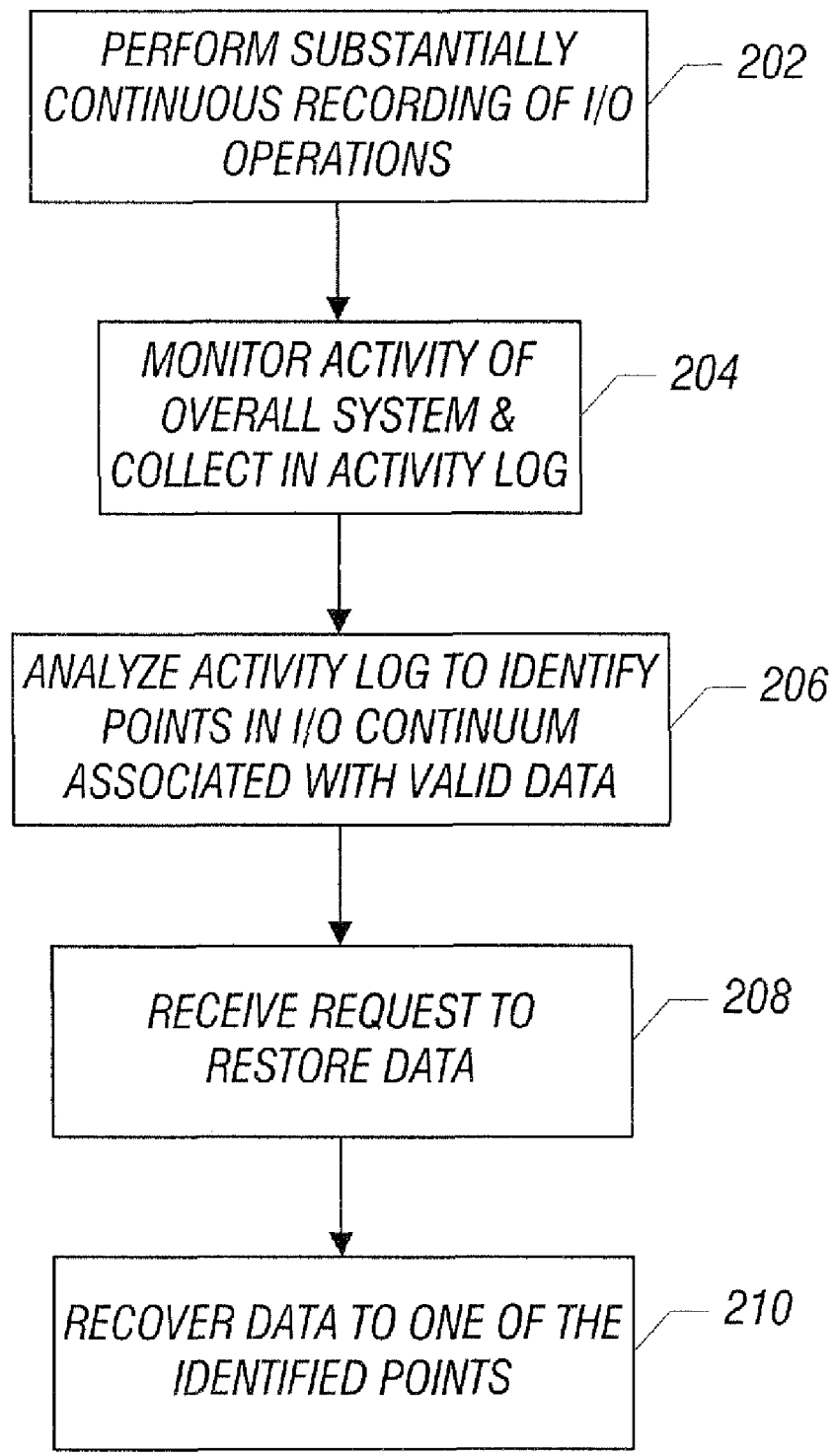
FIG. 2 is a flow diagram of a process that enables restoration of data to a point in an input/output (I/O) continuum of I/O operations associated with valid data, in accordance with an embodiment.

FIG. 2 illustrates a procedure performed by components in the system of FIG. 1. In the system, I/O operations that modify are substantially continuously recorded (at 202), such as by the CDP module 104 in FIG. 1, to create the I/O continuum 112.

In addition, activity of the overall system is monitored (at 204) and collected into the activity log 132, such as by the analysis module 122. The monitored activity can include the various activities referred to above. The analysis module 122 analyzes (at 206) the activity log 132 to identify points in the I/O continuum 112 that are associated with valid data. For example, the analysis module 122 can determine confidence levels associated with different points in the I/O continuum, and identify those points with confidence levels greater than a threshold as being associated with valid data. The identified points in the I/O continuum 112 can be communicated to the restore module 116 in the backup storage system 102.

Next, a request to restore data is received (at 208), such as by the restore module 116 in the backup storage system 102. This request may have been received in response to detection of an error, for example, or for any other reason. In response to the request to recover data, the restore module 116 recovers (at 210) the data to one of the identified points associated with valid data. In some implementations, the restore module 116 recovers data to the most recent valid point in the I/O continuum 112.

By employing techniques according to some embodiments, flexibility is provided to a system administrator or user to recover data to any valid point in an I/O continuum. The ability to identify valid points in the I/O continuum that are associated with valid data enables recovery of valid data, such that the likelihood of data loss or corruption is reduced.

Instructions of software described above (including the CDP module 104, application 105, restore module 116, analysis module 122, and application 130 of FIG. 1) are loaded for execution on a processor (such as one or more CPUs 106, 118, 124 in FIG. 1). The processor includes microprocessors, microcontrollers, processor modules or subsystems (including one or more microprocessors or microcontrollers), or other control or computing devices. As used here, a "processor" refers to a single component or to plural components (whether software or hardware).

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of restoring data, comprising:
   performing substantially continuous recording of input/output (I/O) operations in a storage system to provide an I/O continuum of I/O operations;
   identifying, based on analyzing activity that affects data stored in the storage system, points in the I/O continuum associated with valid data, wherein identifying the points in the I/O continuum associated with valid data based on analyzing the activity comprises identifying the points in the I/O continuum based on analyzing at least one characteristic selected from among: (1) a rate of I/O to a storage medium in the storage system, and (2) a rate of I/O of an application accessing data in the storage medium; and
   restoring data in the storage system to one of the identified points.

2. The method of claim 1, wherein restoring data to one of the identified points comprises restoring the data to a prior valid version of the data.

3. The method of claim 1, further comprising:
   receiving a request to restore data,
   wherein restoring the data is in response to the request.

4. The method of claim 1, wherein the identified points in the I/O continuum correspond to different time points, and wherein restoring data to the one point comprises receiving the data to a most recent one of the time points.

5. The method of claim 1, further comprising:
   monitoring the activity and collecting the activity into an activity log; and
   accessing the activity log to analyze records in the activity log to identify the points in the I/O continuum associated with valid data.

6. The method of claim 1, wherein performing substantially continuous recording of the I/O operations in the storage system comprises performing substantially continuous recording of I/O operations that modify data in the storage system.

7. The method of claim 6, wherein performing substantially continuous recording of the I/O operations that modify data comprises continuously recording each and every I/O operation that modifies data in the storage system.

8. The method of claim 6, wherein performing substantially continuous recording of the I/O operations that modify data comprises recording I/O operations that modify data every predefined time interval, wherein the predefined time interval is one hour or less.

9. An article comprising at least one computer-readable storage medium containing instructions that when executed cause a computer to:
   analyze activity associated with a storage system to identify points in an input/output (I/O) continuum of I/O operations associated with valid data, wherein the I/O continuum is created in response to substantially continuous recording of the I/O operations, wherein analyzing the activity to identify the points in the I/O continuum associated with valid data comprises analyzing at least one characteristic selected from among: (1) a rate of I/O to a storage medium of the storage system, and (2) a rate of I/O of an application accessing data in the storage medium of the storage system; and
   provide the identified points in the I/O continuum to a restore module to enable the restore module to restore data of the storage system to one of the identified points.

10. The article of claim 9, wherein substantially continuous recording of I/O operations comprises one of: (1) continuously recording each and every I/O operation that modifies data in the storage system; and (2) recording I/O operations that modify data every predefined time interval, wherein the predefined time interval is one hour or less.

11. A processing system comprising:
   at least one processor; and
   software executable on the at least one processor to:
      substantially continuously record input/output (I/O) operations in a storage system to provide an I/O continuum of I/O operations;
      identify, based on analyzing activity associated with the storage system, points in the I/O continuum associated with valid data, wherein analyzing the activity to identify the points in the I/O continuum associated with valid data comprises analyzing at least one characteristic selected from among: (1) a rate of I/O to a storage medium in the storage system, and (2) a rate of I/O of an application accessing data in the storage medium; and
      restore data to one of the identified points.

12. The processing system of claim 11, wherein the substantially continuously recorded I/O operations comprises I/O operations that modify data in the storage system.

13. The method of claim 1, wherein the identifying comprises:
   identifying a particular one of the points in the I/O continuum as associated with valid data in response to determining that the rate of I/O to the storage medium is less than a predefined threshold.

14. The method of claim 1, wherein the identifying comprises:
   identifying a particular one of the points in the I/O continuum as associated with valid data in response to determining that the rate of I/O of the application accessing data in the storage medium is less than a predefined threshold.

15. The article of claim 9, wherein the identifying comprises:
   identifying a particular one of the points in the I/O continuum as associated with valid data in response to determining that the rate of I/O to the storage medium of the storage system is less than a predefined threshold.

16. The article of claim 9, wherein the identifying comprises:
   identifying a particular one of the points in the I/O continuum as associated with valid data in response to determining that the rate of I/O of the application accessing data in the storage medium of the storage system is less than a predefined threshold.

17. The processing system of claim 11, wherein the identifying comprises:
   identifying a particular one of the points in the I/O continuum as associated with valid data in response to determining that the rate of I/O to the storage medium is less than a predefined threshold.

18. The processing system of claim 11, wherein the identifying comprises:
   identifying a particular one of the points in the I/O continuum as associated with valid data in response to determining that the rate of I/O of the application accessing data in the storage medium is less than a predefined threshold.

* * * * *